Figure 1:
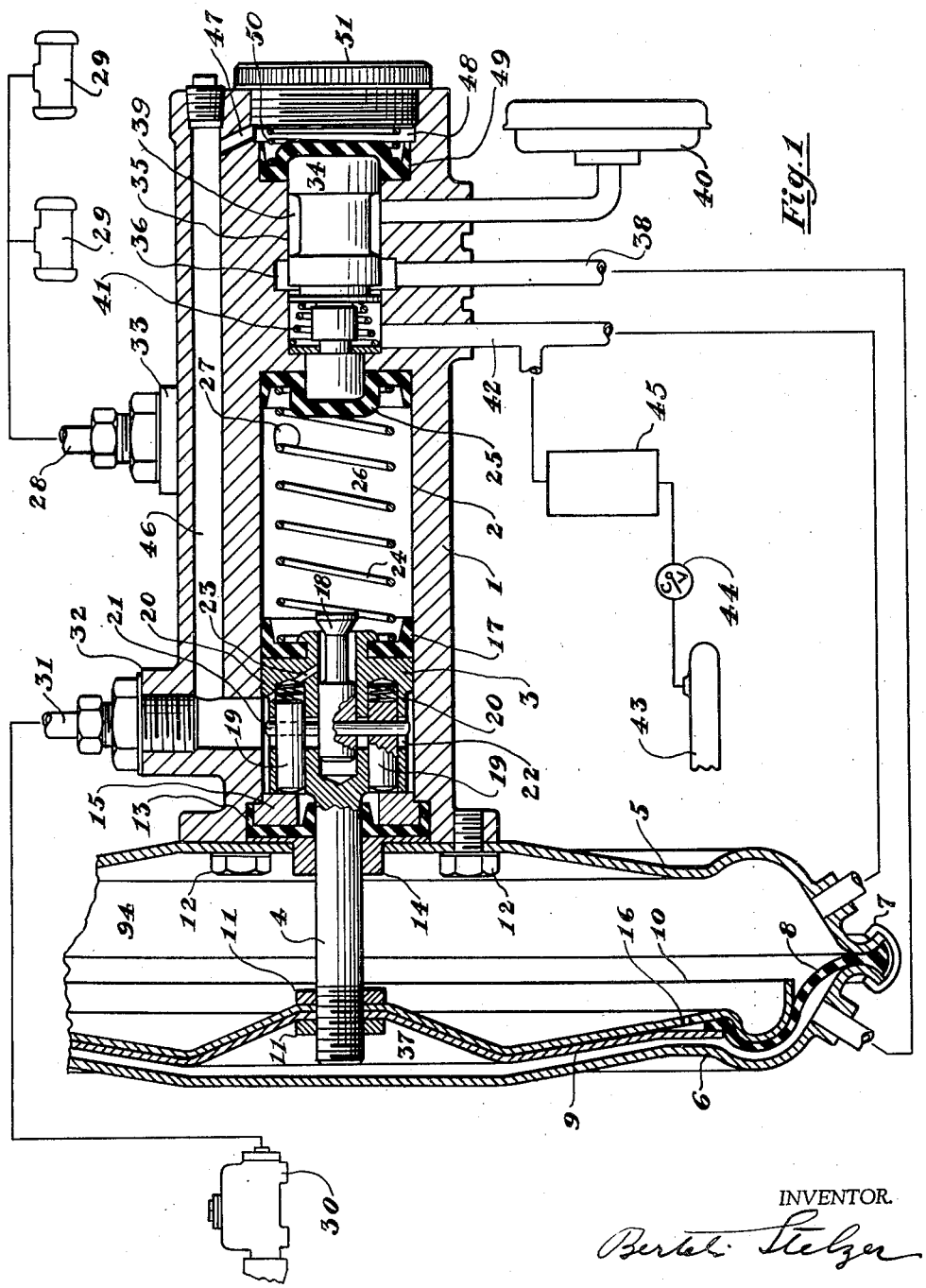

Oct. 28, 1941.    B. STELZER    2,260,490
HYDRAULIC BRAKE BOOSTER
Filed June 27, 1939    3 Sheets-Sheet 1

INVENTOR.
Bertel Stelzer

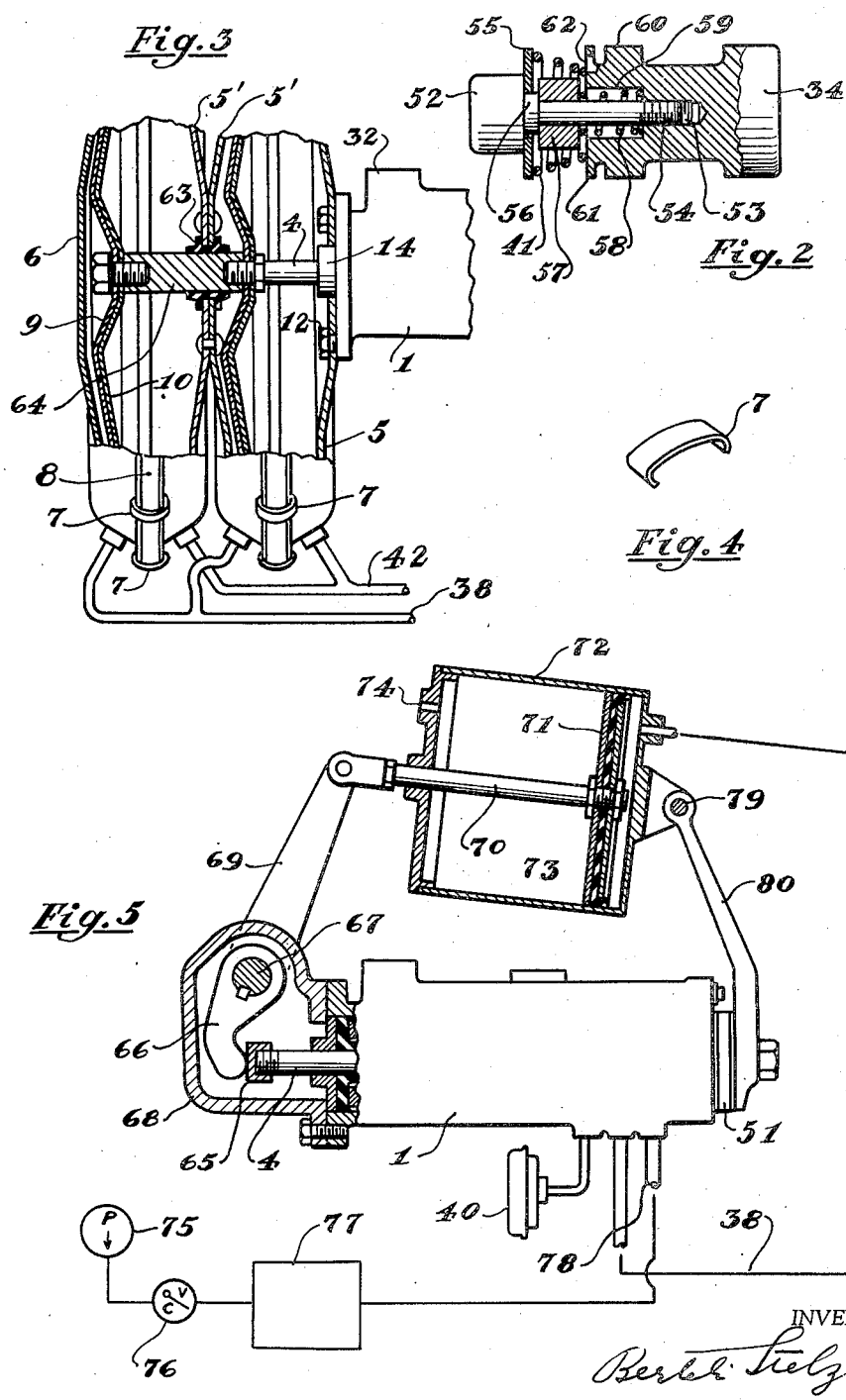

Oct. 28, 1941.  B. STELZER  2,260,490
HYDRAULIC BRAKE BOOSTER
Filed June 27, 1939  3 Sheets-Sheet 3
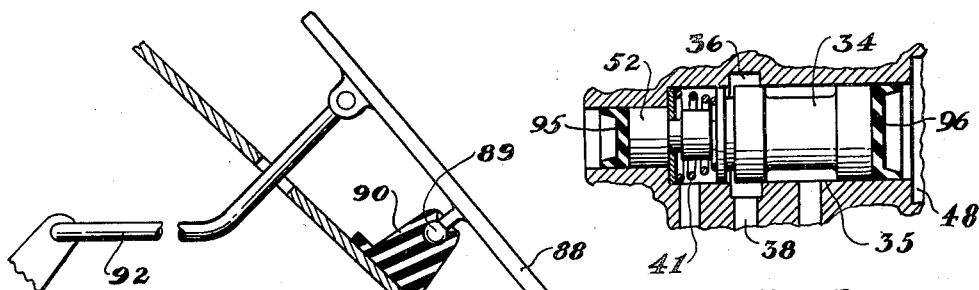
Fig. 7
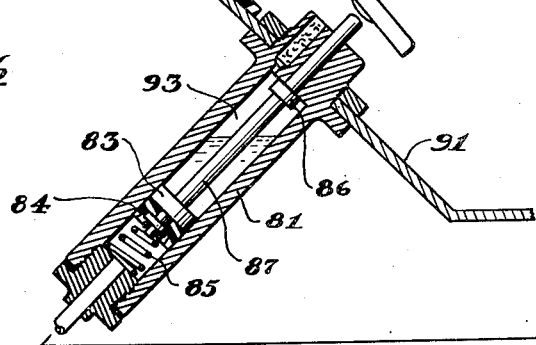
Fig. 6
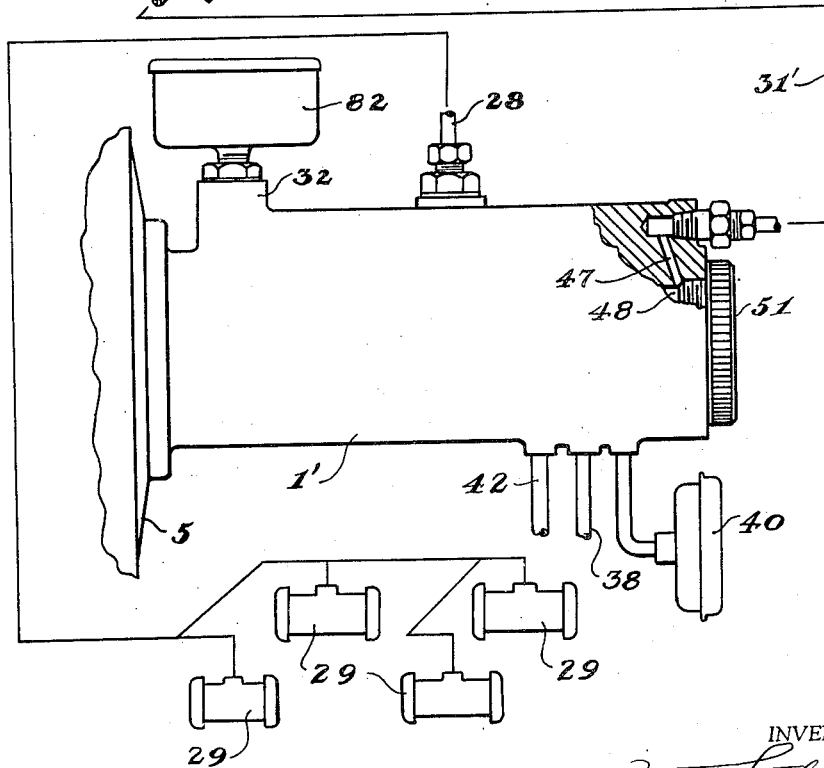
INVENTOR.
Bertel Stelzer Patented Oct. 28, 1941

2,260,490

UNITED STATES PATENT OFFICE 2,260,490

HYDRAULIC BRAKE BOOSTER

Bertell Stelzer, Los Angeles, Calif.

Application June 27, 1939, Serial No. 281,375

8 Claims. (Cl. 188—152)

REISSUED JUL 2 1943

The invention relates to boosters for hydraulic braking systems in automotive vehicles and more particularly to a vacuum or air-operated power booster controlled by the fluid from the master cylinder.

The object of the invention is, first, to provide a power booster that may be placed anywhere on the vehicle and merely connected with the hydraulic brake lines, without disturbing the original setup of the brake pedal and master cylinder; and, second, to provide a booster acting in true proportion to the pedal pressure to effect "feel" of the brakes, accomplished by the introduction of a novel fluid operated differential pressure valve.

Another object is to provide a power braking system where the conventional brake pedal may be dispensed with and the brake more quickly applied by operation of the accelerator pedal.

Other objects may appear by inspection of the drawings, wherein:

Fig. 1 is a diagrammatic sectional view of the hydraulic booster mechanism connected to illustrate the use of vacuum as a source of power;

Fig. 2, a sectional view of the differential valve plunger;

Fig. 3, a fragmentary view showing in section how a plurality of power cylinders may be used;

Fig. 4, a detail perspective view of a clip by means of which the shells making up the power cylinder are held together;

Fig. 5, a diagrammatic view of a modification illustrating the use of a conventional power cylinder of the sliding piston type in conjunction with the hydraulic booster, shown connected for use of compressed air as a source of power;

Fig. 6, a diagram showing a modified application of the hydraulic brake booster shown in Fig. 1, where the master cylinder merely operates the control valve; and Fig. 7, a sectional view of the valve showing conventional seals.

Referring now to Fig. 1, there is shown a hydraulic booster cylinder and valve housing 1 in whose cylinder bore 2 slides a piston 3 connected by its piston rod 4 to the piston of a diaphragm type power cylinder composed of shells 5 and 6 clamped together with clips 7, with a diaphragm 8 interposed, secured at its inner circle to the diaphragm piston composed of clamping or piston plates 9 and 10. The nuts 11 hold the plates together and secure them to said piston rod 4. The power cylinder is tightly bolted to the hydraulic booster cylinder 1 by bolts 12, and shell 5 serves to retain a seal 13, piston rod bearing 14, and piston stop 15. The cylinder shells and piston plates are preferably dished for greater strength, and so formed that the smallest volume exists between the diaphragm piston and shell 6. Plate 10 is provided with a hole 16 so that the atmospheric pressure acts on plate 9, whereby the latter not only serves as a clamping plate for the diaphragm, but also as a structural member of the piston, transmitting pressure to the piston rod 4. The hydraulic piston 3 has a piston seal 17 and is provided with a check valve 18 which is opened when the piston is in the "off" position, as shown in Fig. 1. For this purpose small plungers 19 are provided siding in holes against helical compression springs 20. A transverse pin 21 extends through these plungers 19 and the stem of check valve 18 so that they move in unison. A clearance hole 22 is provided for pin 21 in the piston, to allow the valve to close by virtue of springs 20 when the piston leaves the "off" position. A passage 23 allows flow of fluid through the piston when the valve is open. A return spring 24 yieldingly urges the piston toward its "off" position, and at the same time retains the valve diaphragm 25 in position, which seals off chamber 26 of the cylinder. This chamber communicates through passage 27 and conduit 28 with the wheel cylinders 29. The other end of the cylinder, which is sealed against the power cylinder by seal 13, is connected to the master cylinder 30 by conduit 31 secured to inlet boss 32. For conduit 28, an outlet boss 33 is provided, so that it communicates with chamber 26. To automatically control the supply of power to the power cylinder, a novel differential pressure valve is incorporated consisting of two diaphragms of different area acting against each other and operating a valve plunger or piston to direct power to the power cylinder. The valve plunger 34 is accurately fitted to slide in the bore 35, so as to open groove 36 either to vacuum or to atmospheric pressure. Groove 36 communicates with chamber 37 of the power cylinder by means of a conduit 38, chamber 39 formed by a groove in the valve plunger 34 is open to the atmosphere, 40 designating an air cleaner. The chamber in which spring 41 is located communicates through conduit 42 with the source of power, such as for instance the intake manifold 43 of an internal combustion engine, with a check valve 44 and reservoir 45 interposed. In conjunction with Diesel engines, a vacuum pump would be used. To simplify the construction, the above-mentioned diaphragms of different area work directly against the valve plunger, and at the same time serve as seals. The area of the plunger where it engages the diaphragm is the effective area on which the pressure acts, and the desirable proportion of the areas is approximately 1:2.5. The low pressure produced by the master cylinder 30 is communicated through drilled passages 46 and 47 to chamber 48, acting on the diaphragm or seal 49 held on its seat by a spring 50 retained by the sealing plug 51. The plunger itself is of a novel construction shown in detail in Fig. 2. It is rendered adjustable by making the plunger of two pieces, 34 and 52, the tapped hole 53 receiving the threaded end 54. The spring 41 acting on a disc 55 slidable on shoulder 56, a slidable collar 57, and a helical coil spring 58 in recess 59 are placed intermediate said plunger parts 52 and 34. The conical spring 41 serves to place the valve plunger 34 into its "off" position when the pressure in the master cylinder is below a certain limit, whereby no power is supplied to boost the hydraulic pressure to the wheel cylinders 29. This spring is preferably sufficiently strong to resist the pressure produced by the master cylinder until the brake shoes are brought into contact with the brake drum. The second internal spring 58 is considerably lighter, and serves to increase the resistance to the movement of the plunger towards the "on" position exactly when shoulder 60 of plunger 34 registers with the annular groove 36. Another shoulder 61 merely serves as a guide for the valve plunger, and the passage of air is permitted by one or a plurality of holes 62.

Referring now to Fig. 3, there is shown how the outside diameter of the power cylinder may be decreased or the power capacity increased. This is accomplished by placing two cylinders in tandem. Shell 6 is placed on the outside, and the dividing wall between the two cylinders is made up of two shells 5' riveted together, with a rubber seal 63 in the center in which slides a piston rod extension 64 rigidly interconnecting the two diaphragm pistons.

In the modification in Fig. 5 the diaphragm cylinder is replaced by a power cylinder of the sliding piston type, and the hydraulic booster cylinder and valve unit is maintained in the form shown in Fig. 1. The end of the piston rod 4 is covered with a cap 65 engaging the cam lever 66 keyed to a shaft 67 turning in a housing 68 bolted to cylinder 1. A lever 69 rigid with shaft 67 engages the end of the piston rod 70 to which is secured the piston 71 of the power cylinder 72. Chamber 73 of this power cylinder is open to the atmosphere at 74. By way of example, and applicable also to Fig. 1, this system is shown connected to a source of power using fluid pressure, such as compressed air, where 75 designates an air compressor or pump, 76 a check valve, and 77 a reservoir. The air cleaner is connected to the chamber in which spring 41 is, and the pressure line 78 is connected to communicate with chamber 39. The power cylinder is pivotally supported at 79 by a bracket 80 rigidly secured to the end plug 51, or directly to cylinder 1. The hydraulic connections 31 and 28 are exactly the same as already shown in Fig. 1, and are therefore not repeated.

In the modification shown in Fig. 6 the novel device is shown connected purely for power braking, and instead of the usual master cylinder a special master cylinder 81 is used serving merely to apply the control valve. The hydraulic brake booster unit as shown in Fig. 1 is maintained, except that passage 46 is not drilled through, and line 31' is connected only with chamber 48. To the inlet 32 is conveniently connected a brake fluid reservoir 82 open to atmospheric pressure. In order not to encumber the drawing, this reservoir has been shown diagrammatically and is therefore out of proportion. The valve operating or master cylinder 81 has a piston 83 with a piston seal 84 urged to the starting or release position by a conical spring 85, the release position being determined by the shoulder or collar 86 on piston rod 87 which slidably extends through the upper portion of the cylinder so that it may be depressed by operation of the accelerator pedal 88. The latter is pivotally supported at 89, 90 designating a bracket secured to the toe board 91 of an automotive vehicle, and 92 the accelerator rod leading to the throttle of an internal combustion engine. The upper chamber 93 in the cylinder may serve as a reservoir for the operating fluid. In order to reduce the effort of the operator to apply the brakes, the diameter of cylinder 81 is considerably smaller than that of the valve plunger 34.

In Fig. 7 the proportion of the valve housing is somewhat modified to accommodate conventional seals 95 and 96 which take the place of seals 25 and 49, respectively.

Considering the construction in Fig. 1 in operation, and the hydraulic system filled with brake fluid, depression of the brake pedal by the operator and application of master cylinder 30 forces brake fluid from the master cylinder through line 31, passage 23, as well as past the piston seal 17 into chamber 26, and from there through passage 27 and line 28 to the wheel cylinders, expanding the brake shoes and bringing them into contact with the brake drums. As the only resistance to this operation is offered by the brake shoe retraction springs, the effort is small and the hydraulic pressure consequently low, so that the fluid acting on diaphragm 49 does not overcome spring 41. However, as the brake shoes begin to engage the drums the resistance to further expansion increases and the hydraulic pressure builds up, whereby due to the difference in area of the valve diaphragms the plunger 34 is moved to compress spring 41 and to close the passage between groove 36 and line 42. When the plunger 34 has reached a position where shoulder 60 registers with groove 36, so that line 38 is completely shut off both from line 42 and atmospheric chamber 39, an additional resistance comes into play. This becomes evident by inspection of Fig. 2. At this point disc 55 has come into contact with collar 57, so that plunger 34 pauses until the hydraulic pressure in the master cylinder is further increased. I call this the "holding" position. After the pressure has increased and the plunger has moved forward, communication is established between line 38 and the atmosphere. Now as both sides of the power cylinder have been previously evacuated, and chamber 94 of the power cylinder is permanently connected to the vacuum source, admission of air into chamber 37 forces the diaphragm piston 10 toward the hydraulic booster cylinder, moving piston 3 and compressing spring 24. As soon as piston 3 has moved a small distance away from stop 15, valve 18 closes by virtue of the light springs 20, and the pressure in chamber 26 is built up, it being the sum of the pressure produced by the master cylinder plus that produced by the power cylinder. When the hydraulic pressure in chamber 26 has reached a pre-determined multiple of that of the master cylinder 30, governed by the proportion of the effective areas of the valve diaphragm 25 and 49, and the counter-acting forces are again balanced, the springs 41 and 58 return the plunger 34 to its intermediate or "holding" position where shoulder 60 just closes off groove 36. The reason for the pause at this point is the elimination of spring 58 because collar 57 stops against shoulder 56. This novel arrangement is devised to prevent the fluctuation and oscillation back and forth of the valve plunger, thus preventing considerable waste of power as well as wear of the valve plunger. Upon retractile movement of the master cylinder 30, when the pressure behind piston 3 and in chamber 48 falls, the existing pressure in chamber 26 immediately returns the valve plunger to its original or "off" position, which is the position illustrated in Fig. 1. Thus chamber 37 is evacuated again, attaining the same static pressure as chamber 94, so that the pistons 3 and 10 are returned to the "off" position by spring 24, and the valve 18 is opened, permitting passage of fluid from the wheel cylinders 29 back to the master cylinder. Due to the small volume of chamber 37 in the "off" position, and to the arrangement which permits application of the brakes without movement of the booster pistons, resulting in a very short stroke, very little power is required. Chamber 94 serves as an effective reservoir, so that many brake applications may be made even after the engine has been stopped.

In the construction shown in Fig. 5 the same action takes place as already described in Fig. 1, except that application of the valve by fluid pressure from the master cylinder provides communication between lines 78 and 38, directing compressed air into cylinder 72, thus moving piston 71 and applying the booster. In the "off" position line 38 communicates with the atmosphere.

A considerably different function is obtained by the construction illustrated in Fig. 6, as in this case the device shown in Fig. 1 is not merely a booster but the only prime mover to apply the brakes. Depression of the accelerator pedal 88 by the operator, and consequent depression of piston 83 produces a pressure in line 31' which is communicated to chamber 48, moving valve plunger 34 until line 38 communicates with the atmosphere and the power cylinder is applied as long as the pressure in chamber 26 does not exceed a certain multiple of the master cylinder pressure, as described in Fig. 1. The primary object of this construction is to provide quicker brake application and the elimination of the brake pedal.

The different embodiments have been shown to illustrate the multiplicity of constructions to which my invention may be applied, and I am aware that for instance the power cylinder may be connected in ways different from those shown, without departing from the principle of the invention, and the hydraulic brake booster may be used in conjunction with other hydraulic braking systems, or hydraulic transmissions constructed in a similar manner, the system illustrated has been shown merely by way of example.

I wish to make it understood that by the term "booster" I mean to designate a device which serves only as a helper, but does not do all the work. This is in contrast to the so-called power brake. I am aware that power brakes have been made with valve control depending on fluid pressure, and I do not wish to claim such a combination, the system on which I base my claims uses the manual effort of the operator to apply the brakes, and the effort of the booster is merely added or superimposed on said manual effort.

While three illustrative embodiments have been described in detail, it is not my intention to limit the scope of the invention to these particular embodiments, or otherwise than by the terms of the appended claims.

I claim:

1. In a hydraulic braking system for a vehicle having wheels, a master cylinder, wheel cylinders, a pressure booster to augment the hydraulic pressure in said wheel cylinders, fluid transmission means from said master cylinder to said pressure booster and from the latter to said wheel cylinders, a source of power to operate said pressure booster, valve means to direct power to said pressure booster, said valve means being responsive to the hydraulic pressure produced by said master cylinder and the boosted hydraulic pressure in said wheel cylinders, whereby the hydraulic fluid from the master cylinder acts directly on one side of said valve means and the hydraulic fluid from the wheel cylinders acts directly on the other side of said valve means, and yielding means urging said valve means to pause to lock the power in said pressure booster.

2. In a hydraulic braking system for a vehicle having wheels, a manually operated hydraulic master cylinder, a power-operated hydraulic pressure booster, hydraulic fluid transmitting means between said master cylinder and said pressure booster, wheel cylinders to operate the brakes, hydraulic fluid transmitting means between said pressure booster and said wheel cylinders, said power operated hydraulic pressure booster being included to augment the hydraulic pressure directed to the wheel cylinders and to perform part of the work, the other part of the work to be performed by said master cylinder, a valve responsive to the hydraulic fluid pressure of the master cylinder and the hydraulic fluid pressure of the wheel cylinders to control the power with which the pressure booster is operated, whereby the hydraulic fluid pressure from the master cylinder acts directly on one side of said valve and the hydraulic fluid pressure from the wheel cylinders acts directly on the other side of said valve, said pressure booster being distinct from said master cylinder and a unit in itself, so that it may be mounted at any convenient place in the vehicle without the use of mechanical linkage.

3. In a hydraulic braking system for a vehicle having wheels, a manually operated hydraulic master cylinder, a power-operated hydraulic pressure booster to produce a secondary pressure superimposed on the primary pressure produced by said master cylinder, wheel cylinders to operate the brakes, hydraulic fluid transmitting means between said master cylinder and said hydraulic pressure booster, hydraulic fluid transmitting means between said hydraulic pressure booster and said wheel cylinders, the pressure of the hydraulic fluid being conducted to the hydraulic pressure booster to superimpose the pressure on the fluid in the wheel cylinders, and valve means responsive to the hydraulic pressure in the master cylinder and the hydraulic pressure in the wheel cylinders to direct power to said pressure booster to boost the pressure of the hydraulic fluid transmitted to the wheel cylinders, whereby the hydraulic fluid from said master cylinder acts directly on one side of said valve means and the hydraulic fluid from the wheel cylinders acts directly on the other side of said valve means.

4. In a braking system for an automotive vehicle, a hydraulic pressure booster, a master cylinder operable by means of the accelerator pedal of said vehicle, wheel cylinders to apply the brakes, fluid pressure transmission means from said master cylinder to said pressure booster and from said pressure booster to said wheel cylinders, a source of power to operate said pressure booster, and valve means responsive to the hydraulic pressure of the master cylinder and the hydraulic pressure in the wheel cylinders to direct power to said pressure booster, whereby the hydraulic fluid from the master cylinder acts directly on one side of said valve means and the hydraulic fluid from the wheel cylinders acts directly on the other side of said valve means, said master cylinder being included in said braking system not only to control said valve means, but also to apply the brakes with the help of said booster, said booster and said valve means forming a single, self-contained unit, connected with the other parts of said braking system by said fluid pressure transmission means, substantially as described.

5. In a hydraulic braking system for a vehicle having wheels and wheel cylinders, a master cylinder operated by the operator, a hydraulic pressure booster to augment the hydraulic pressure transmitted to said wheel cylinders and to perform part of the work, a power cylinder to actuate said hydraulic pressure booster, a source of power for said power cylinder, fluid pressure transmitting means from said master cylinder to said hydraulic pressure booster and from the latter to said wheel cylinders, and adjustable valve means to direct power from said source of power to said power cylinder, said valve means being responsive to the hydraulic pressure in said wheel cylinders and the hydraulic pressure in said master cylinder to engage power in proportion to the hydraulic pressure in said master cylinder, whereby the hydraulic fluid from said master cylinder acts directly on one side of said valve means to urge said valve means to increase the power directed to said power cylinder and the hydraulic fluid from said wheel cylinders acts directly on the other side of said valve means to urge said valve means to decrease the power directed to said power cylinder.

6. In a braking system for automotive vehicles, a hydraulic master cylinder operated by the operator, wheel cylinders to engage the brakes, a hydraulic pressure booster cylinder to augment the pressure in said wheel cylinders without increasing the hydraulic pressure in said master cylinder, hydraulic fluid transmitting means from said master cylinder to said pressure booster cylinder, hydraulic fluid transmitting means from said pressure booster cylinder to said wheel cylinders, a diaphragm type power cylinder co-axial with said hydraulic booster cylinder and adapted to operate said hydraulic booster cylinder, a source of power for said power cylinder, a valve to direct power from said source of power to said power cylinder, means responsive to the hydraulic pressure produced by said master cylinder to urge said valve to direct power to said power cylinder and to thereby boost the pressure in said wheel cylinders, means responsive to the hydraulic pressure produced in said wheel cylinders to urge said valve to decrease the power directed to said power cylinder, said means responsive to the hydraulic pressure opposing each other and being proportioned to obtain the desired ratio between master cylinder pressure and the boosted wheel cylinder pressure, whereby the hydraulic fluid from said master cylinder acts directly on one side of said valve and the hydraulic fluid from the wheel cylinders acts directly on the other side of said valve, said means responsive to the hydraulic pressure being engaged mechanically with said valve, means to provide a passage for the hydraulic fluid to flow from said wheel cylinders to said master cylinder when said booster cylinder is in the "off" position, and means to provide passage of the hydraulic fluid from said master cylinder to said wheel cylinders when the pressure in said master cylinder is higher than in the wheel cylinders, said diaphragm type power cylinder, said hydraulic pressure booster cylinder, said valve, and said means responsive to the hydraulic pressure forming a single, self-contained unit, connected to the other parts of said braking system by said hydraulic fluid transmitting means.

7. In a hydraulic braking system for a vehicle having wheels, a manually operated master cylinder, wheel cylinders to engage the brake shoes, a hydraulic pressure increasing device to augment the hydraulic pressure in said wheel cylinders and to perform part of the work, fluid pressure transmitting means from said master cylinder to said hydraulic pressure increasing device, fluid pressure transmitting means from said hydraulic pressure increasing device to said wheel cylinders, a source of power to operate said hydraulic pressure increasing device, a valve responsive to the hydraulic pressure produced by said master cylinder and the hydraulic pressure in said wheel cylinder, whereby the hydraulic fluid from said master cylinder acts directly on one side of said valve and the hydraulic fluid from said wheel cylinders acts directly on the other side of said valve, said valve being adapted to direct power to and from said hydraulic pressure increasing device to increase the hydraulic pressure in said wheel cylinders to a predetermined multiple of the hydraulic pressure in said master cylinder after the necessary effort to apply the brakes further has increased.

8. In a braking system for automotive vehicles, a master cylinder operated by the operator, wheel cylinders to actuate the brakes, a hydraulic pressure booster in hydraulic communication with said master cylinder, to augment the hydraulic pressure in said wheel cylinders, a power cylinder to operate said hydraulic pressure booster, a source of power consisting of a supply of air and a source of relatively lower pressure than the pressure of said air, a valve to control the flow of air to and from said power cylinder, a control piston responsive to the hydraulic pressure produced by said master cylinder to urge said valve to direct air to said power cylinder to operate said hydraulic pressure booster and to thereby increase the hydraulic pressure in said wheel cylinders, and a smaller control piston axially aligned with and opposing said first-mentioned control piston, said smaller control piston being responsive to the hydraulic pressure in said wheel cylinders, said control pistons being proportioned to obtain a boosted hydraulic pressure in said wheel cylinders which is a predetermined multiple of the hydraulic pressure in said master cylinder, said control pistons being connected mechanically with said valve whereby the hydraulic fluid from the master cylinder acts directly on one side of said valve and the hydraulic fluid from the wheel cylinders acts directly on the other side of said valve.

BERTELI STELZER.